United States Patent
Bales et al.

(10) Patent No.: US 9,374,721 B1
(45) Date of Patent: Jun. 21, 2016

(54) DYNAMIC MANAGEMENT OF BASE STATION RADIATION PATTERN BASED ON FEEDBACK FROM ADJACENT BASE STATION

(71) Applicant: Sprint Spectrum L.P., Overland Park, KS (US)

(72) Inventors: Stephen R. Bales, Lee's Summit, MO (US); Maneesh Gauba, Overland Park, KS (US); Gene S. Mitchell, Blue Springs, MO (US); Martin Zeller, Trimble, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 34 days.

(21) Appl. No.: 14/547,788

(22) Filed: Nov. 19, 2014

(51) Int. Cl.
| | |
|---|---|
| *H04B 7/00* | (2006.01) |
| *H04W 24/02* | (2009.01) |
| *H04W 16/28* | (2009.01) |
| *H04W 84/04* | (2009.01) |
| *H04W 48/20* | (2009.01) |

(52) U.S. Cl.
CPC .............. *H04W 24/02* (2013.01); *H04W 16/28* (2013.01); *H04W 48/20* (2013.01); *H04W 84/045* (2013.01)

(58) Field of Classification Search
CPC ..... H04W 48/20; H04W 36/18; H04W 36/30; H04W 48/16; H04B 7/022
USPC .............. 455/525, 524, 523, 500, 517, 552.1, 455/553, 1, 550.1, 67.11, 67.13, 422.1, 403, 455/426.1, 426.2, 423–425, 561, 562.1; 370/252, 310, 328, 329, 317, 332, 334
See application file for complete search history.

(56) References Cited

U.S. PATENT DOCUMENTS

| | | | |
|---|---|---|---|
| 8,687,514 B2 | 4/2014 | Yamamoto et al. | |
| 2006/0002287 A1 | 1/2006 | Kuwahara et al. | |
| 2013/0260746 A1* | 10/2013 | Wigren ................ | H04B 17/382 455/423 |

FOREIGN PATENT DOCUMENTS

EP        2663116 A1        11/2013

OTHER PUBLICATIONS

Elkamchouchi, Hassan M., Dr., "Dynamic Null Steering in Linear Antenna Arrays Using Adaptive Particle Swarm Optimization Algorithm", Proceedings of the Third International Conference on Wireless and Mobile Communications (ICWMC), 2007.

* cited by examiner

*Primary Examiner* — Keith Ferguson

(57) ABSTRACT

Methods and systems for reducing interference between base stations are disclosed herein. In accordance with an example method, a first base station iterates through emitting of a plurality of different radiation patterns from the first base station. The first base station also receives, from a second base station, feedback based on evaluation by the second base station of noise floor respectively for each of the different radiation patterns emitted from the first base station. Based on the received feedback, the first base station then sets itself to operate with a particular one of the radiation patterns. Example base stations and communication networks operable to perform the disclosed methods are also disclosed.

20 Claims, 6 Drawing Sheets

DYNAMIC MANAGEMENT OF BASE STATION RADIATION PATTERN BASED ON FEEDBACK FROM ADJACENT BASE STATION

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices (whether or not operated by a human user), can operate. In turn, each base station may be coupled with network infrastructure that provides connectivity with one or more transport networks, such as the public switched telephone network (PSTN) and/or the Internet, for instance. With this arrangement, a UE within a coverage area of a base station may engage in air interface communication with the base station and may thereby communicate via the base station with various remote network entities or with other UEs served by the cellular wireless network.

Further, the cellular wireless network may operate in accordance with a particular air interface protocol or "radio access technology," with communications from the base stations to UEs defining a downlink or forward link, and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of UEs, initiation of communications, handover between coverage areas, and other functions related to air interface communication.

Typically, a wireless service provider operates numerous base stations in a given geographic region, to provide robust air interface coverage to UEs as the UEs move from one location to another. These base stations are usually not associated with any particular subscriber or group of subscribers; rather, they are normally placed in publicly-accessible locations so that their coverage areas blanket cities, rural areas, etc. so that the base stations may be generally accessed by any of the wireless service provider's subscribers. As such, these types of base stations are generally known as "macro base stations," and the network that they collectively form, or to which they belong, is generally known as a "macro network."

Many macro-network subscribers, in addition to having wireless service (which may include data service) for their UE, may also have high-speed ("broadband") Internet access provided through another communication channel. This channel may be cable-modem service, digital-subscriber-line (DSL) service, satellite-based Internet service, and/or some other type of connection to the Internet. For example, a subscriber may have a cable modem connected (a) via a coaxial cable to the cable provider's network and (b) via an Ethernet cable to a wired or wireless (e.g., IEEE 802.11 (WiFi)) router. The router may include one or more Ethernet ports to which computers or other devices may be connected via an Ethernet cable, and may also include wireless-access-point functionality, providing a WiFi packet-data interface to wireless network adapters of devices such as laptop computers, digital video recorders (DVRs), appliances and/or other computing devices.

To address coverage gaps in the macro-network (e.g., poor coverage amidst tall buildings or poor in-building coverage) and for other reasons, wireless service providers may operate various "small cells" (also sometimes referred to as picocells, ubicells, microcells, or as femto-, pico-, ubi-, or micro-base stations or base transceiver stations), which are essentially small, low-power, low-capacity, and low-cost versions of a macro base station. Also, wireless service providers may offer their subscribers a certain sort of small cell known as a "femtocell." As a general matter, a femtocell, which may be approximately the size of a desktop phone or WiFi access point, may communicate (through a wired or wireless link) with the subscriber's broadband router and may establish a virtual private network (VPN) connection via the Internet with the wireless service provider's core network (e.g., with a femtocell controller on the wireless service provider's network). Further, the femtocell may include a wireless communication interface that is compatible with the subscriber's UE and that is arranged to serve the UE in much the same way that a macro base station does. In this way, the UE is provided access to the core network even though the UE may be located within a coverage gap of the macro network.

Overview

Although a first base station (e.g., a femtocell, but generally any sort of small cell or macro base station) may be useful in providing enhanced network connectivity to UEs located in a coverage gap of a macro network, the operation of the first base station may have some undesirable effects. For instance, the first base station may be located close enough to a second base station (e.g., a macro base station, but generally any sort of small cell as well) to interfere with communications of the second base station, for example, because the first base station may be transmitting on the same signal frequency as the second base station. In some instances, signals transmitted by the first base station may render signals transmitted by other UEs to the second base station undetectable by the second base station (e.g., by raising the noise floor at the second base station).

This problem may be alleviated by configuring the first base station to coordinate its operations directly or indirectly with the second base station. For example, as part of a diagnostic sequence, the first base station may sequentially emit several different radiation patterns, any of which the first base station could later use to provide network connectivity to UEs (e.g., UEs within a coverage gap of the macro network). After or as the first base station emits these different radiation patterns, it may receive feedback (directly or via an intermediary device) from the second base station indicating a degree to which each radiation pattern emitted by the first base station interferes with communications of the second base station. As an example, the feedback may indicate a respective noise floor detected by the second base station while the first base station is emitting each radiation pattern. (This diagnostic sequence may be performed at night when network load is low, so that changes in detected noise floor may be attributed somewhat accurately to the different radiation patterns being emitted by the first base station.) In another example, the feedback may simply indicate which of the radiation patterns emitted by the first base station provides the least amount of interference at the second base station. The feedback may additionally or alternatively reflect which emitted radiation pattern resulted in a null at a null direction that is most closely aligned with the second base station. The first base station may then use this feedback as a basis for selecting one of the emitted radiation patterns to use for providing network connectivity to UEs. For instance, the first base station may select a given radiation pattern that causes the least amount of interference (e.g., a lowest noise floor) at the second base station or a given radiation pattern that results in a null direction that is most closely aligned with the second base station.

Accordingly, in one respect, disclosed is a first method operable by a first base station. In accordance with the first method, the first base station iterates through emitting of a plurality of different radiation patterns from the first base station. The first base station then receives, from a second base station, feedback based on evaluation by the second base station of noise floor respectively for each of the different radiation patterns emitted from the first base station. Based on the received feedback, the first base station then sets itself to operate with a particular one of the radiation patterns.

In another respect, disclosed is a second method operable by a first base station. In accordance with the second method, the first base station iterates through providing a plurality of different null directions. The first base station then receives, from a second base station, feedback based on evaluation by the second base station of noise floor respectively for each of the different null directions provided by the first base station. Based on the received feedback, the first base station then selects a particular null direction of the plurality of null directions and based on the selection, sets itself to operate with the particular null direction.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not limit the scope of the claims.

DETAILED DESCRIPTION

It should be understood that arrangements described in this section are set forth only as examples. Those skilled in the art will appreciate that other arrangements and elements (e.g., machines, interfaces, functions, orders, and groupings of functions, etc.) may be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out using hardware, firmware, and/or software. For example, various functions may be carried out by a processor executing instructions stored in memory.

By the term "substantially," it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
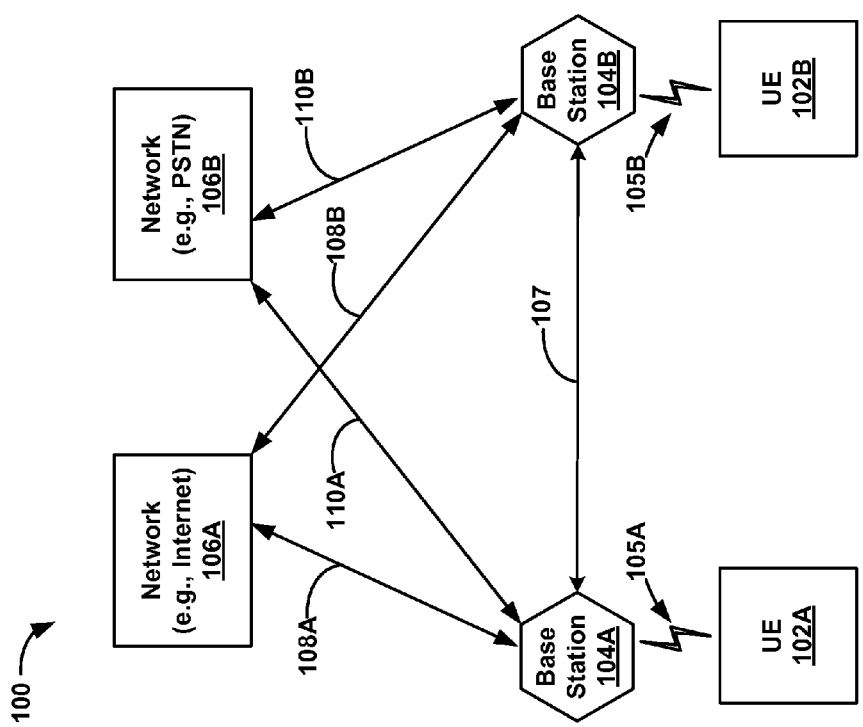
FIG. 1 is a simplified block diagram of an example communication system.

As shown in FIG. 1, an example communication system 100 includes UEs 102A and 102B, base stations 104A and 104B, and networks 106A and 106B, any of which may form the communication system 100 via communication links 105A, 105B, 107, 108A, 108B, 110A, and 110B. In some examples, the communication system 100 may include additional devices, such as additional UEs in communication with the base stations 104A and/or 104B, additional devices and/or base stations in communication with the networks 106A and/or 106B, etc. Also, there may be one or more routers, cable modems, switches, gateways, and/or other devices or networks forming the communication links 105A, 105B, 107, 108A, 108B, 110A, 110B.

UEs 102A and 102B may each include a user interface, a wireless-communication interface, a processor, and data storage comprising instructions executable by the processor for carrying out various functions (e.g., communicating with base stations 104A and/or 104B). The user interface may include buttons, a touch-screen, a microphone, and/or any other elements for receiving inputs, as well as a speaker, one or more displays, and/or any other elements for communicating outputs. The wireless-communication interfaces of UEs 102A and 102B may include an antenna and a chipset suitable for communicating wirelessly with base stations 104A and/or 104B over communication links 105A and/or 105B (e.g, via CDMA, GSM, EV-DO, Wi-Fi, Bluetooth, etc.). As examples, UEs 102A and/or 102B may be or include a cell phone, a personal digital assistant (PDA), a desktop computer, a laptop computer, a tablet computer, a hybrid CDMA/EV-DO device, and/or a multi-mode cellular/Wi-Fi device.

Base stations 104A and 104B may each include a communication interface, a processor, and data storage comprising instructions executable by the processor to carry out various functions disclosed herein. The communication interface may include one or more radiative elements (e.g., antennas and/or antenna elements), chipsets, and/or other components for wirelessly communicating (e.g., via CDMA, GSM, Bluetooth, Wifi, etc.) with UEs 102A and/or 102B via communication links 105A and/or 105B. The communication interface of each base station 104A and 104B may also include one or more wired (e.g., Ethernet) interfaces for communicating with other UEs (not shown), other base stations, and/or the networks 106A and 106B. (An example base station 200 is described in more detail below with reference to FIG. 2.) The base stations 104A and 104B may communicate with networks 106A and/or 106B via communication channels 108A, 108B, 110A, and 110B, as shown in FIG. 1.

Networks 106A and 106B may each generally represent any collection of networked computing devices. For example, the networks 106A and 106B may each include one or more wide area networks, one or more local area networks, one or more public networks, one or more private networks, one or more wired networks, one or more wireless networks, etc. In some examples the network 106A may include the global packet-data network generally referred to as the Internet, and the network 106B may include the PSTN. Further, in some instances, the communication links 108A and 110A may include a respective VPN connection between the base station 104A and the networks 106A and 106B. For example, the base station 104A may include a small cell, and the communication links 108A and 110A may include one or more of a router, a cable modem, a VPN terminator, a switch, and a gateway providing access to the network 106A. As another example, the base station 104B may include a macro base station, and the communication links 108B and 110B may each include a gateway and/or a switch that provides the base station 104B with access to the networks 106A and 106B.

Figure 2:
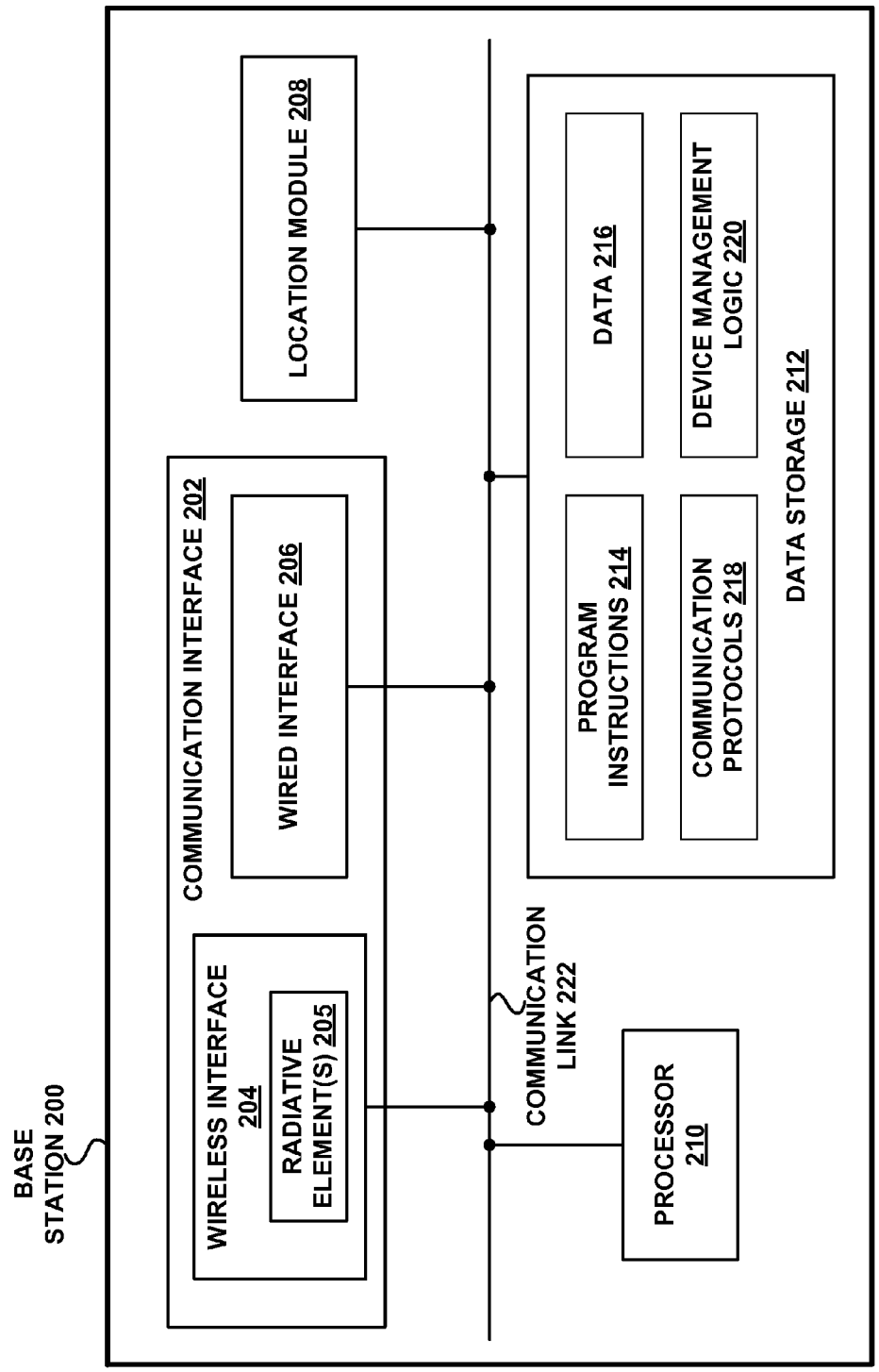
FIG. 2 is a simplified block diagram of an example base station.

FIG. 2 is a simplified block diagram of an example base station 200, which may be similar in any or all aspects to the base stations 104A and 104B depicted in FIG. 1. As shown in FIG. 2, the base station 200 includes a communication interface 202, a location module 208, a processor 210, and data storage 212, all communicatively coupled via communication link 222. Note that the base station 200 may have additional and/or different components, and that the structure shown in FIG. 2 is provided by way of example. By further example, one or more components of the base station 200 may be distributed over a number of physical locations and need not be integrated within a single device.

The communication interface 202 may include a wireless interface 204, which may further include one or more radiative elements (e.g., antennas and/or antenna elements) 205. The wireless interface 204 may be configured to pass oscillating currents respectively through the radiative elements 205 causing the radiative elements 205 to emit electromagnetic radiation characterized by various radiation patterns. In analogous examples, the wireless interface 204 may provide oscillating voltages across input terminals of the radiative elements 205 or provide respective signal input power to the radiative elements 205. For example, in order to emit various radiation patterns, the wireless interface 204 may be configured to (i) provide an independently controlled signal magnitude and/or signal phase to each radiative element 205 and to (ii) mechanically adjust a position or orientation of one or more of the radiative elements 205.

The communication interface 202 may also include a wired interface 206. The wired interface 206 may facilitate wired communication between the base station 200 and various networks (e.g., networks 106A and 106B). The wired interface 206 may provide a wired packet-data interface for communicating with a device such as a router, cable modem, or another base station.

The location module 208 may include one or more of a special purpose processor and a receiver suitable for receiving and decoding Global Positioning System (GPS) signals for determining a location of the base station 200. For example, the location module 208 may receive GPS signals from one or more satellites and use the received GPS signals to determine a location of the base station 200. In some examples, the processor 210 may use the received GPS signals to determine the location of the base station 200. The processor 210 may comprise multiple (e.g., parallel) processors, such as a general purpose microprocessor and/or a discrete digital signal processor.

The data storage 212 may take various forms, in one or more parts, such as a non-volatile storage block and/or a removable storage medium, and may include (a) program instructions 214 executable by the processor 210 for carrying out any function described herein, (b) data 216, which may be any operational data or other type of data stored for use by the base station 200, (c) communication protocols 218, facilitating and enabling communication with one or more other devices, and (d) device management logic 220, perhaps for memory and file management.

Figure 3:
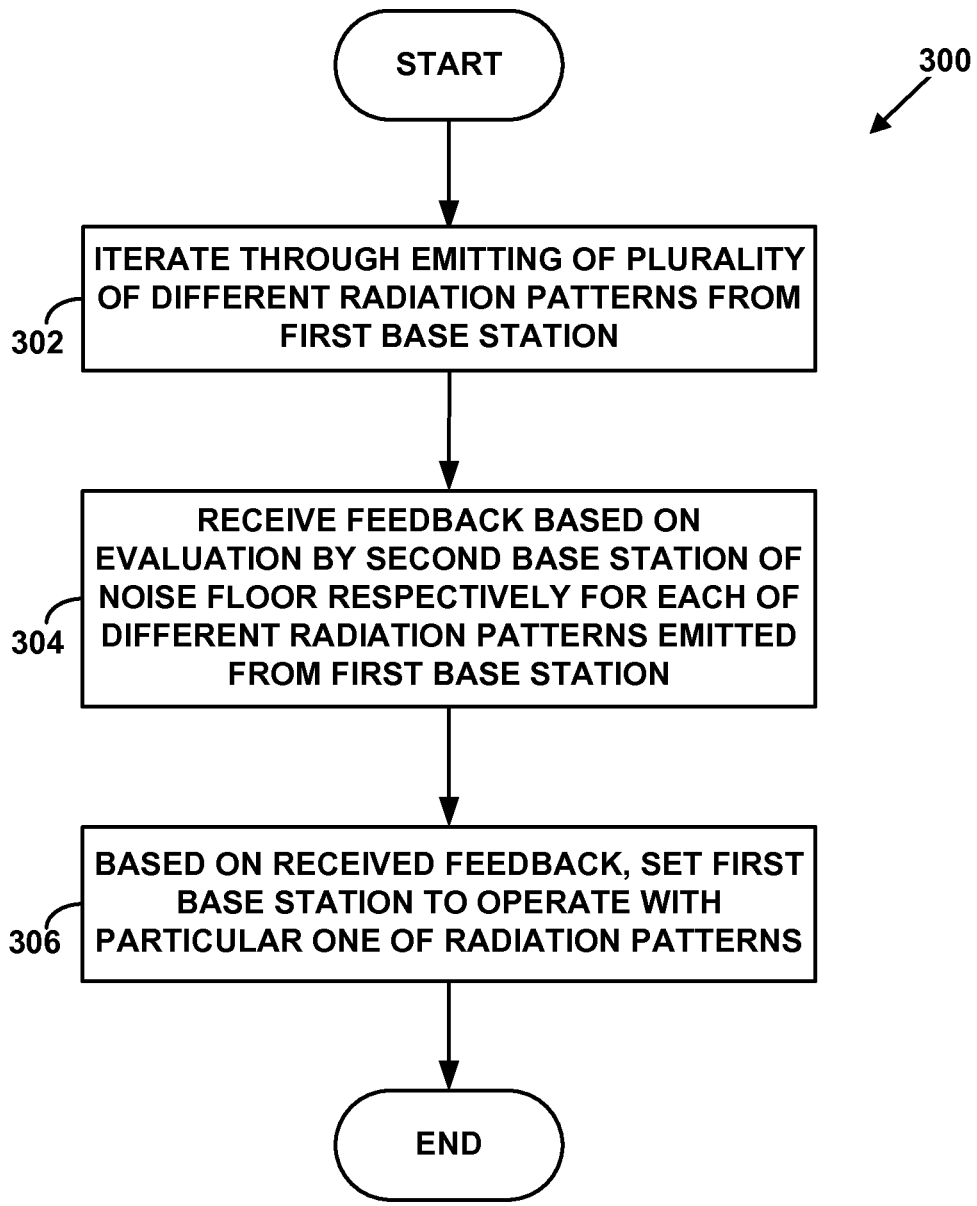
FIG. 3 is a flowchart of an example method.

FIG. 3 is a flowchart of an example method 300. At block 302, the method 300 involves iterating, by a first base station, through emitting of a plurality of different radiation patterns from the first base station. For example, the base station 104A may iterate through emitting (in any order) at least two of radiation patterns 402A, 402B, 402C, and 402D that are depicted respectively in FIGS. 4A, 4B, 4C, and 4D. Each radiation pattern 402A-D may define a directional dependence of a power density emitted or radiated by the base station 104A. In FIGS. 4A-D, the base station 104A is shown as including six radiative elements 404A, 404B, 404C, 404D, 404E, and 404F that are arranged upon vertices of a hexagon (or alternatively, at sixty-degree intervals along a circumference of a circle), however this particular arrangement and the number of radiative elements 404A-F shown in FIGS. 4A-D are chosen for illustrative purposes only. In other examples, the base station 104A may include any number of radiative elements in any arrangement. It should also be noted that the radiation patterns 402A-D are shown solely for illustrative purposes as well, and that the base station 104A may iterate through emitting other radiation patterns in addition to radiation patterns 402A-D. In addition, radiation patterns 402A-D are depicted in FIGS. 4A-D as two-dimensional radiation patterns, however one of skill in the art will understand that concepts and functions described herein will be applicable to three-dimensional radiation patterns as well.

Figure 4A:
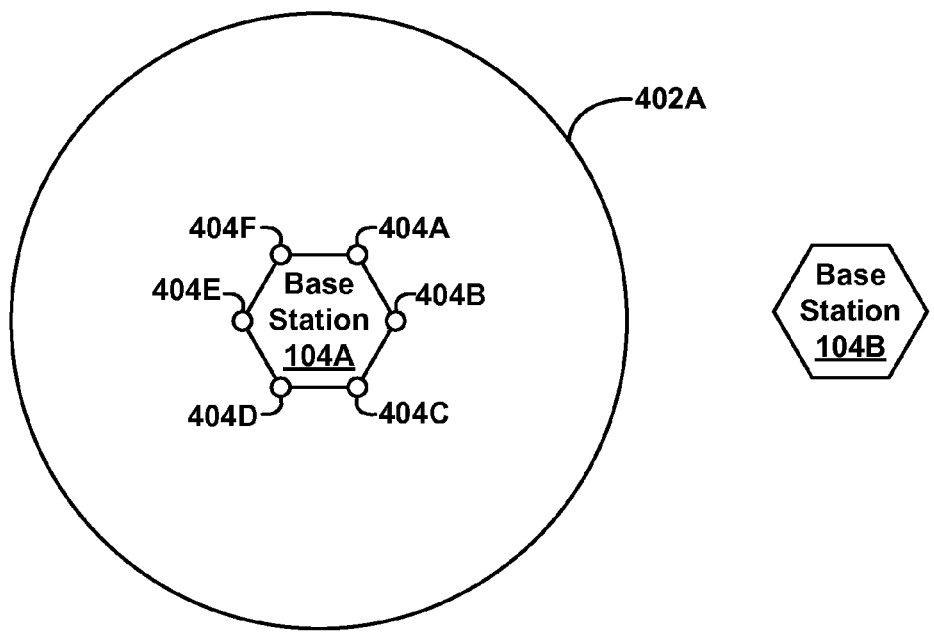
FIG. 4A depicts example base stations and an example radiation pattern.

Referring to FIG. 4A, the base station 104A may first emit the radiation pattern 402A, which is substantially omnidirectional, by providing substantially equal amounts of power (e.g., in the form of an oscillating signal) respectively to each of the six radiative elements 404A-F. As a means for comparison with the other radiation patterns 402B-D, the base station 104A provides an arbitrary power P/6 to each of the radiative elements 404A-F to emit the radiation pattern 402A. (One of skill in the art will recognize that analogous examples may include the base station 104A causing a current I/6 to flow through each of the radiative elements 404A-F or providing a voltage V/6 across input terminals of each of the radiative elements 404A-F.) In some examples, after emitting the radiation pattern 402A, the base station 104A may receive, from the base station 104B, feedback related to noise floor that is, at least in part, representative of the emitted radiation pattern 402A. In other examples, the base station 104A might not receive any feedback related to detected noise floor(s) until the base station 104A has emitted every radiation pattern of the plurality (e.g., radiation patterns 402A-D).

Figure 4B:
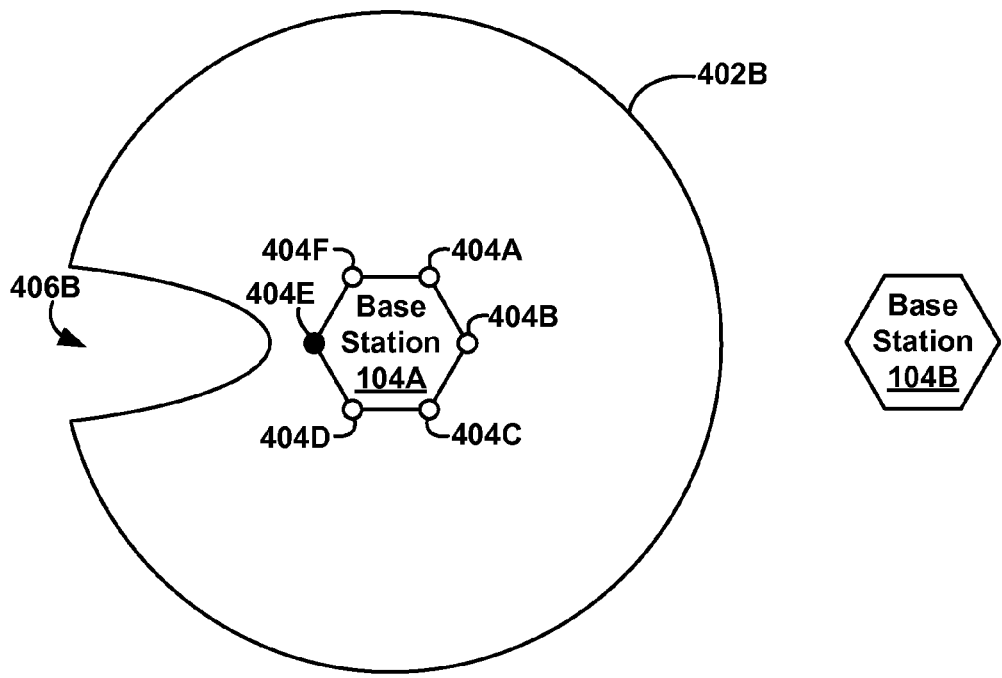
FIG. 4B depicts example base stations and an example radiation pattern.

Referring to FIG. 4B, the base station 104A may then disable or otherwise reduce power provided to the radiative element 404E, so that the radiation pattern 402B is emitted. The radiation pattern 402B may include a null 406B located at a null direction that points away from the base station 104B (with reference to the base station 104A). For example, the base station 104A may provide zero (or substantially zero) power to the radiative element 404E, while providing a power P/5 to each of the radiative elements 404A-D and 404F (thereby cooperatively providing a total amount of power P to the radiative elements 404A-F). Note, that in other examples the radiation pattern 402B may represent a total amount of power provided cooperatively to the radiative elements 404A-F that is greater than or less than P. There are a number of additional ways, aside from providing zero (or substantially zero) power to the radiative element 404E, for the base station 104A to emit the radiation pattern 402B. For example, the base station 104A may provide respective signals to the radiative elements 404A-F that differ in magnitude and/or phase. The base station 104A (or a human operator) may also mechanically adjust respective positions and/or orientations of the radiative elements 404A-F. Other methods for manipulating a radiation pattern produced by the radiative elements 404A-F will be apparent to one of skill in the art.

In some examples, after emitting the radiation pattern 402B, the base station 104A may receive, from the base station 104B, feedback related to noise floor that is, at least in part, representative of the emitted radiation pattern 402B.

Figure 4C:
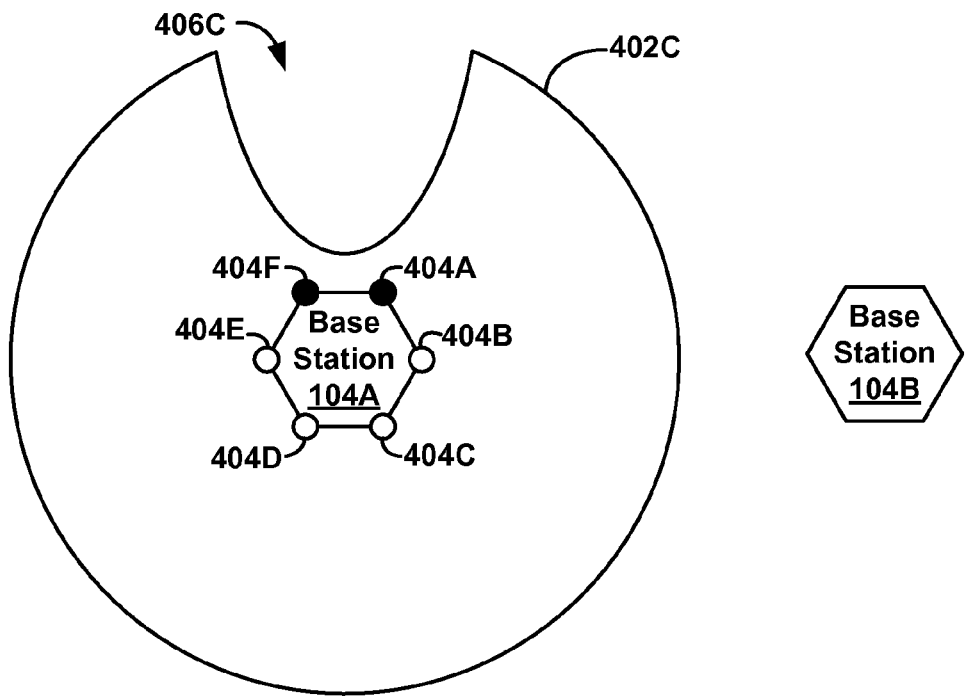
FIG. 4C depicts example base stations and an example radiation pattern.

Referring next to FIG. 4C, the base station 104A may again change the respective signals provided to the radiative elements 404A-F, or mechanically adjust positions and/or orientations of the radiative elements 404A-F to emit the radiation pattern 402C. For example, the base station 104A may (i) disable or provide signals having substantially zero power to the radiative elements 404A and 404F and (ii) provide a power P/4 to each of the radiative elements 404B-E. The base station 104A may then emit the radiation pattern 402C having a null 406C at a null direction that is aligned neither toward nor away from the base station 104B (with reference to the base station 104A). As shown in FIG. 4C, disabling or respectively providing signals having substantially zero power to the radiative elements 404F and 404A may generate a null 406C that is wider than the null 406B of FIG. 4B which is generated by disabling only the radiative element 404E.

In some examples, after emitting the radiation pattern 402C, the base station 104A may receive, from the base station 104B, feedback related to noise floor that is, at least in part, representative of the emitted radiation pattern 402C.

Figure 4D:
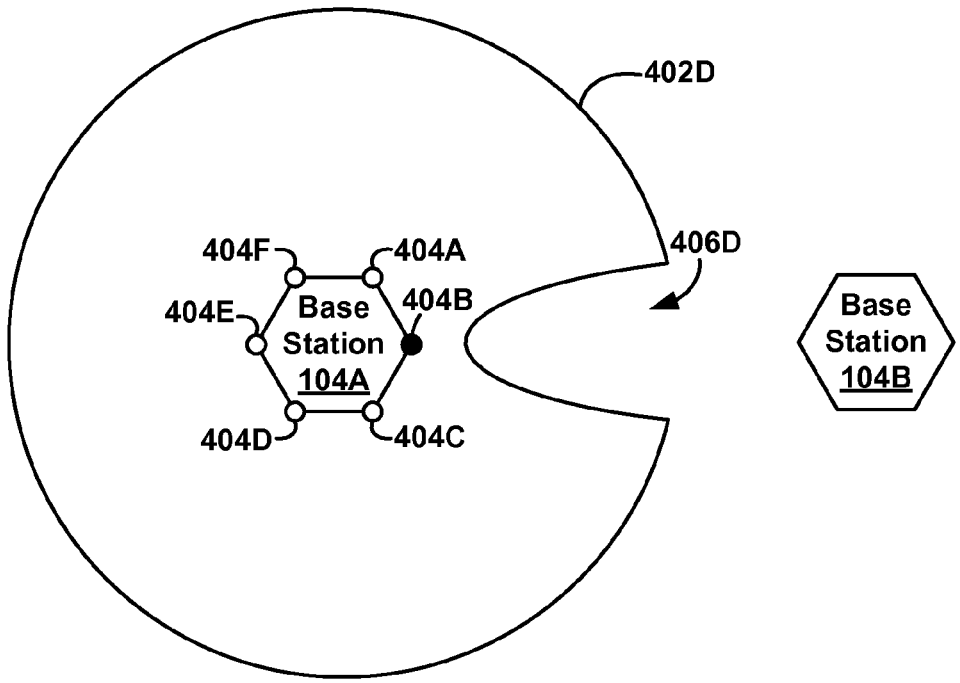
FIG. 4D depicts example base stations and an example radiation pattern.

Referring to FIG. 4D, the base station 104A may yet again change the respective signals provided to the radiative elements 404A-F, or mechanically adjust positions and/or orientations of the radiative elements 404A-F to produce the radiation pattern 402D. For example, the base station 104A may (i) disable or provide a signal having substantially zero power to the radiative element 404B and (ii) provide a power P/5 to each of the radiative elements 404A and 404C-F. The base station 104A may thereby emit the radiation pattern 402D having a null 406D at a null direction that is directed toward the base station 104B (with reference to the base station 104A).

In some examples, after emitting the radiation pattern 402D, the base station 104A may receive, from the base station 104B, feedback related to noise floor that is, at least in part, representative of the emitted radiation pattern 402D. For example, the feedback received by the base station 104A after emitting the radiation pattern 402D may be representative of noise floors corresponding respectively to one or more of the radiation patterns 402A-C and/or the radiation pattern 402D.

Referring again to FIG. 3, at block 304 the method 300 involves receiving by the first base station, from a second base station, feedback based on evaluation by the second base station of noise floor respectively for each of the different radiation patterns emitted from the first base station. Referring to FIG. 1 for example, the base station 104A may receive feedback from the base station 104B via the (wired or wireless) communication link 107.

In some examples, the base station 104A may send a request to receive the feedback from the base station 104B, and the base station 104B may send the feedback to the base station 104A in response to the request. In other examples, the base station 104B may simply send the feedback to the base station 104A as or after the base station 104B evaluates noise floors for each of the radiation patterns emitted from the base station 104A. For instance, the feedback may be received by the base station 104A after all of the radiation patterns 402A-D have been emitted (and perhaps not until then). In another situation, the feedback may be received by the base station 104A intermittently over time. For example, the base station 104A may receive feedback pertaining to noise floor corresponding to the radiation pattern 402A after emitting the radiation pattern 402A, but before emitting the radiation pattern 402B. Similarly, the base station 104A may receive feedback pertaining to noise floor corresponding to the radiation pattern 402B after emitting the radiation pattern 402B, but before emitting the radiation pattern 402C, etc.

The feedback may include a respective noise floor report for each of the plurality of radiation patterns 402A-D. (A noise floor may include any metric indicating or representing (i) an absolute power of noise detected at the base station 104B or (ii) a ratio of noise to signal detected at the base station 104B.) For example, the received feedback may indicate that, at the base station 104B, the noise floor corresponding to the radiation pattern 402A is $-50$ dBm, the noise floor corresponding to the radiation pattern 402B is $-40$ dBm, the noise floor corresponding to the radiation pattern 402C is $-40$ dBm, and the noise floor corresponding to the radiation pattern 402D is $-75$ dBm. In some examples, the noise floor report received for each of the radiation patterns 402A-D may include a corresponding timestamp indicating when each noise floor was detected by the base station 104B. In other examples, the received feedback may include a report indicating which radiation pattern of the radiation patterns 402A-D corresponds to a lowest detected noise floor at the base station 104B, and/or a timestamp indicating when the lowest noise floor was detected by the base station 104B. (The base station 104A may use the received timestamps to associate the received noise floor report(s) respectively with the radiation patterns 402A-D.)

Referring yet again to FIG. 3, at block 306 the method 300 involves, based on the received feedback, the first base station setting itself to operate with a particular one of the radiation patterns (e.g., the radiation pattern 402D). For example, the base station 104A setting itself to operate with the radiation pattern 402D may include the base station 104A configuring itself to emit the radiation pattern 402D, and then serving one or more UEs over an air interface defined by the radiation pattern 402D.

In examples where the received feedback includes respective noise floor reports for each of the radiation patterns 402A-D, the base station 104A setting itself to operate with the particular one of the radiation patterns (e.g., the radiation pattern 402D) may include (i) determining, by the base station 104A, which one of the received noise floor reports specifies a lowest noise floor of all of the received noise floor reports and (ii) the base station 104A setting itself to operate with the radiation pattern for which the determined noise floor report was received. Referring to the example above, the noise floor reports may indicate a noise floor of $-50$ dBm for the radiation pattern 402A, a noise floor of $-40$ dBm for the radiation pattern 402B, a noise floor of $-40$ dBm for the radiation pattern 402C, and a noise floor of $-75$ dBm for the radiation pattern 402D. In this case, the base station 104A may determine that the noise floor report corresponding to the radiation pattern 402D specifies the lowest noise floor of all the received noise floor reports (because $-75$ dBm is less than $-50$ dBm). Based on the determination, the base station 104A may set itself to operate with the radiation pattern 402D. In a related example, the base station 104A may set itself to operate with the radiation pattern 402D (e.g., the base station 104A configuring itself to emit the radiation pattern 402D, and then serving one or more UEs over an air interface defined by the radiation pattern 402D) based on receiving a noise floor report indicating that the radiation pattern 402D corresponds to the lowest noise floor detected by the base station 104B.

By further example, the base station 104A may store its own timestamps respectively indicating when each of the radiation patterns 402A-D were emitted from the base station 104A, and then identify the radiation pattern corresponding with the lowest noise floor detected at the base station 104B by comparing the received timestamps with the stored timestamps. For example, the base station 104A may store time stamps indicating that the radiation pattern 402A was emitted at 13:00:00, the radiation pattern 402B was emitted at 13:00:05, the radiation pattern 402C was emitted at 13:00:10, and the radiation pattern 402D was emitted at 13:00:15. The feedback received by the base station 104A from the base station 104B may indicate that a noise floor of −50 dBm was detected at 13:00:00, a noise floor of −50 dBm was detected at 13:00:05, a noise floor of −50 dBm was detected at 13:00:10, and a noise floor of −75 dBm was detected at 13:00:15. (The base stations 104A and 104B may include or have access to synchronized clocks for this purpose.) The base station 104A may use the stored and received timestamps to determine that the lowest detected noise floor corresponds with the radiation pattern 402D (by determining that a noise floor of −75 dBm was detected by the base station 104B at 13:00:15 when the radiation pattern 402D was emitted by the base station 104A. Similarly, the base station 104A may receive from the base station 104B a noise floor report indicating that the lowest noise floor was detected at 13:00:15 and the base station 104A may similarly determine that the lowest detected noise floor corresponds to the radiation pattern 402D. Although in the preceding examples, the base station 104A associated stored and received timestamps based on the timestamps being equal, other examples are possible (e.g., associating a stored time stamp with a received timestamp that differs from the stored timestamp by no more than one second.)

The method 300 may include interactions of the first base station with the second base station. Accordingly, further acts associated with the method 300 may involve performing the method 300 based on the first base station detecting a change in a location of the first base station. For example, it may be useful for the base station 104A (e.g., a small cell) to reconfigure its radiation pattern after the base station 104A has been relocated by a technician or a consumer, so that the relocation of the base station 104A does not cause new interference with the second base station (e.g., a macro base station). For instance, the base station 104A may use an integrated location module (e.g., location module 208) to determine a change in location of the base station 104A. In response, the base station 104A may perform the method 300 to reevaluate and/or mitigate interference the base station 104A may be causing with the communications of the base station 104B. For example, the base station 104A may emit one or more radiation patterns from its new location, and request from the base station 104B, feedback based on evaluation of noise floor for each emitted radiation pattern. More specifically, the base station 104A may send a request to receive feedback after each individual radiation pattern is emitted, or alternatively the base station 104A may send a request to receive a single message that includes feedback regarding noise floors for all of the emitted radiation patterns.

Further acts associated with the method 300 may involve detecting, by the second base station, a change in noise floor at the second base station; and based on detecting the change in noise floor, sending by the second base station, to the first base station, a command to perform the method 300. For example, the base station 104B, perhaps in the course of providing network access to one or more UEs, may detect a change in noise floor. The detected change in noise floor may adversely affect the second base station's ability to provide such network access. Although in some cases the operation of the base station 104A may not be the cause of the change in noise floor at the base station 104B, the base station 104B may send, to the base station 104A, the command for the base station 104A to perform the method 300. Accordingly, the method 300 may also involve receiving by the first base station, from the second base station, a command to perform the method 300; and performing, by the first base station, the method 300 based on receiving the command. If the base station 104A performing the method 300 does not alleviate the change in noise floor at the base station 104B, the base station 104B may send commands to perform the method 300 to other base stations that the base station 104B is in communication with.

Figure 5:
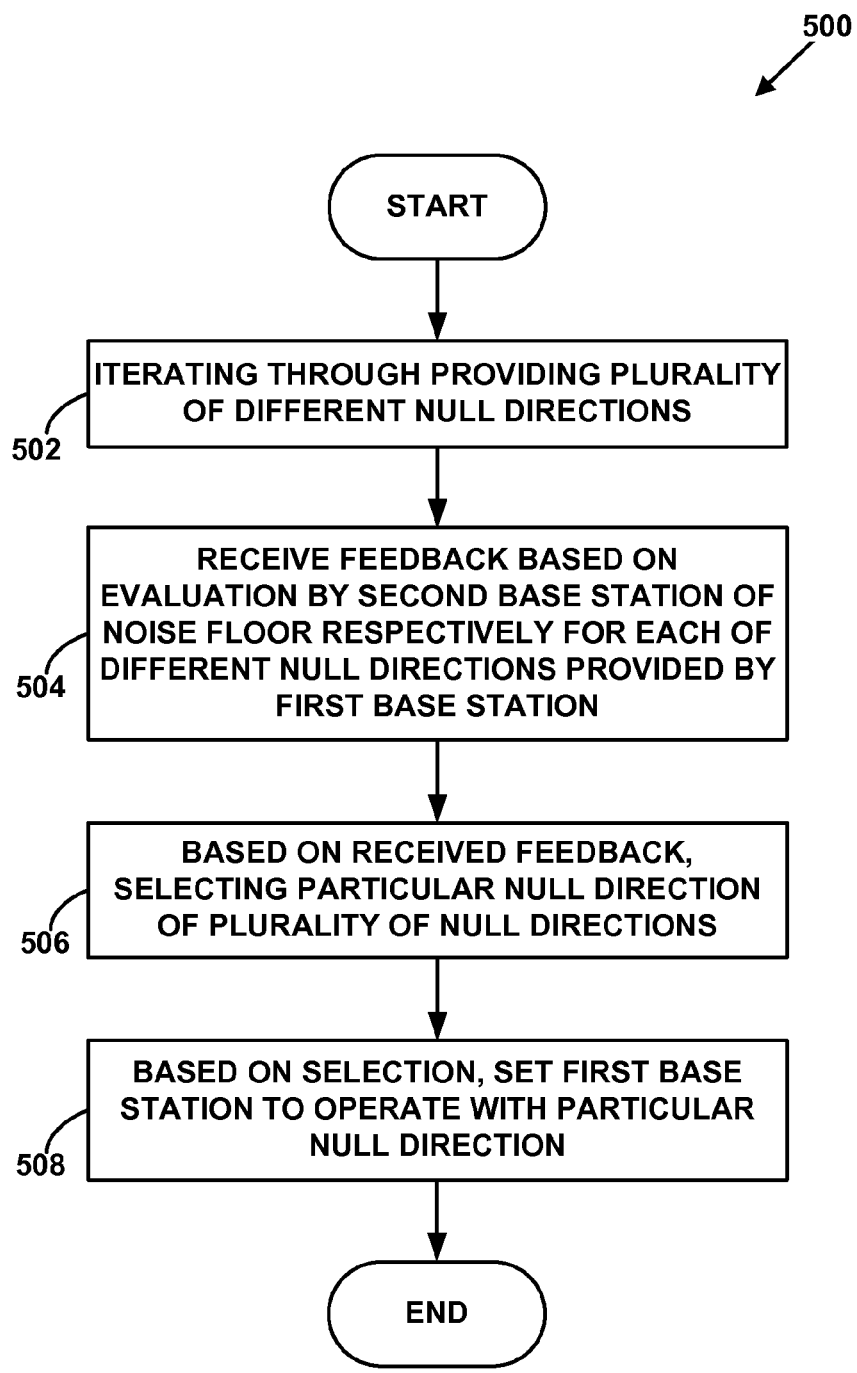
FIG. 5 is a flowchart of an example method.

FIG. 5 is a flowchart of an example method 500. At block 502, the method 500 involves iterating, by a first base station, through providing a plurality of different null directions. Block 502 may include any of the functionality described above with respect to block 302 of the method 300. Referring to FIGS. 4B-D as examples, the base station 104A may emit the radiation pattern 402B having a null 406B directed away from the base station 104B (with respect to the base station 104A), the radiation pattern 402C having a null 406C that is aligned neither toward nor away from the base station 104B (with respect to the base station 104A), and the radiation pattern 402D having a null 406D directed toward the base station 104B (with respect to the base station 104A). Other example radiation patterns may include a plurality of nulls at various respective null directions. So, in one respect, block 502 may include the base station 104A implementing a diagnostic procedure that is known to iteratively aim a null of a radiation pattern in various null directions.

At block 504, the method 500 involves receiving by the first base station, from a second base station, feedback based on evaluation by the second base station of noise floor respectively for each of the different null directions provided by the first base station. Block 504 may include any of the functionality described above with respect to block 304 of the method 304. In addition, the received feedback may indicate whether each respective null direction provided by the base station 104A is sufficiently aligned with the base station 104B so as to adequately reduce interference caused by the base station 104A at the base station 104B.

At block 506, the method 500 involves, based on the received feedback, selecting, by the first base station, a particular null direction of the plurality of null directions. For instance, the base station 104A may select the particular null direction based on the particular null direction being sufficiently aligned with the base station 104B, as indicated by the received feedback.

At block 508, the method 500 involves, based on the selection, the first base station setting itself to operate with the particular null direction. For example, the base station 104A may configure itself to emit the radiation pattern 402D, and then serve one or more UEs over an air interface defined by the radiation pattern 402D. This may allow the base station 104A to provide network coverage to UEs using any radiation pattern that includes a null direction that is equal (or substantially equal) to the particular null direction. For example, the base station 104A may determine that it would be beneficial to increase its radiating power to better serve UEs within its coverage area and select a radiation pattern that provides an increase in overall radiating power while still maintaining a null in a null direction that is substantially aligned with the base station 104B.

Various embodiments have been described above. Those skilled in the art will appreciate, however, that changes from the embodiments are possible, while remaining within the scope of the claims.

We claim:

1. A method comprising:
    iterating, by a first base station, through emitting of a plurality of different radiation patterns from the first base station;
    receiving by the first base station, from a second base station, feedback based on evaluation by the second base station of noise floor respectively for each of the different radiation patterns emitted from the first base station; and
    based on the received feedback, the first base station setting itself to operate with a particular one of the radiation patterns.

2. The method of claim 1, wherein each radiation pattern of the plurality includes a null at a respective null direction, and the null direction of each radiation pattern of the plurality differs from the null direction of each other radiation pattern of the plurality.

3. The method of claim 1, wherein the first base station comprises one or more radiative elements, and wherein iterating through emitting of the plurality of different radiation patterns comprises, for each radiation pattern of the plurality, providing oscillating signals respectively to the one or more radiative elements causing the one or more radiative elements to emit radiation with power density having a directional dependence defined by the radiation pattern.

4. The method of claim 3, wherein a total power of the oscillating signals provided for each radiation pattern of the plurality is substantially equal to a total power of the oscillating signals provided respectively for each other radiation pattern of the plurality.

5. The method of claim 3, wherein a total power of the oscillating signals provided for each radiation pattern of the plurality is unequal to a total power of the oscillating signals provided respectively for each other radiation pattern of the plurality.

6. The method of claim 3, wherein at least one of the oscillating signals provided for a given radiation pattern of the plurality is out of phase with another of the oscillating signals provided for the given radiation pattern.

7. The method of claim 1, wherein iterating through emitting of the plurality of different radiation patterns comprises emitting each of the plurality of radiation patterns by disabling a respective one or more radiative elements of the first base station.

8. The method of claim 1,
    wherein iterating through emitting of the plurality of different radiation patterns comprises, for each radiation pattern of the plurality, providing a particular amount of power cooperatively to one or more radiative elements of the first base station, and wherein the method further comprises:
    allocating the particular amount of power differently to the one or more radiative elements for each radiation pattern of the plurality.

9. The method of claim 1, wherein iterating through emitting of the plurality of different radiation patterns comprises, for each of the plurality of radiation patterns, adjusting a position or an orientation of a radiative element of the first base station.

10. The method of claim 1, further comprising performing the method of claim 1 based on the first base station detecting a change in a location of the first base station.

11. The method of claim 1, further comprising:
    detecting, by the second base station, a change in noise floor at the second base station; and
    based on detecting the change in noise floor, sending by the second base station, to the first base station, a command to perform the method of claim 1.

12. The method of claim 1, further comprising:
    receiving by the first base station, from the second base station, a command to perform the method of claim 1; and
    performing, by the first base station, the method of claim 1 based on receiving the command.

13. The method of claim 1,
    wherein receiving the feedback comprises receiving a respective noise floor report for each of the plurality of radiation patterns, and
    wherein the first base station setting itself to operate with the particular one of the radiation patterns comprises (i) determining, by the first base station, which one of the received noise floor reports specifies a lowest noise floor of all of the received noise floor reports and (ii) the first base station setting itself to operate with the radiation pattern for which the determined noise floor report was received.

14. The method of claim 13, wherein the respective received noise floor report for each of the plurality of radiation patterns comprises a timestamp indicating when the noise floor for each of the radiation patterns was detected by the second base station, the method further comprising:
    storing, by the first base station, timestamps respectively indicating when each of the radiation patterns was emitted from the first base station; and
    determining, based on the stored timestamps and the received timestamps, that the noise floor report specifying the lowest noise floor corresponds with the particular radiation pattern,
    wherein the first base station setting itself to operate with the particular radiation pattern comprises the first base station setting itself to operate with the particular radiation pattern based on determining that the noise floor report specifying the lowest noise floor corresponds with the particular radiation pattern.

15. The method of claim 1,
    wherein receiving the feedback comprises receiving a report indicating which radiation pattern of the plurality corresponds with a lowest noise floor at the second base station, and
    wherein the first base station setting itself to operate with the particular one of the radiation patterns comprises the first base station setting itself to operate with the indicated radiation pattern corresponding to the lowest noise floor.

16. The method of claim 1, wherein the first base station setting itself to operate with the particular one of the radiation patterns comprises the first base station serving one or more user equipment (UE) over an air interface defined by the particular radiation pattern.

17. A first base station comprising:
    one or more radiative elements; and
    a controller, wherein the controller is configured to cause the first base station to perform functions comprising:
        iterating through emitting of a plurality of different radiation patterns by the one or more radiative elements;

receiving from a second base station, feedback based on evaluation by the second base station of noise floor respectively for each of the different radiation patterns emitted by the one or more radiative elements; and based on the received feedback, setting itself to operate with a particular one of the radiation patterns.

18. The first base station of claim 17, wherein the functions further comprise:

detecting a change in a location of the first base station; and performing the functions of claim 17 based on detecting the change in the location of the first base station.

19. The first base station of claim 17, wherein the functions further comprise:

receiving, from the second base station, a command to perform the functions of claim 17; and performing the functions of claim 17 based on receiving the command.

20. A method comprising:

iterating, by a first base station, through providing a plurality of different null directions;

receiving by the first base station, from a second base station, feedback based on evaluation by the second base station of noise floor respectively for each of the different null directions provided by the first base station;

based on the received feedback, selecting, by the first base station, a particular null direction of the plurality of null directions; and based on the selection, the first base station setting itself to operate with the particular null direction.

* * * * *